Jan. 4, 1944.  L. L. CUNNINGHAM  2,338,574
PRESSURE RESPONSIVE APPARATUS FOR DETECTION OR
CONTROL OF ICE OR FOR OTHER PURPOSES
Filed June 7, 1941  2 Sheets-Sheet 1

Inventor,
LEWIS L. CUNNINGHAM
By

Attorney

Patented Jan. 4, 1944

2,338,574

UNITED STATES PATENT OFFICE 2,338,574

PRESSURE RESPONSIVE APPARATUS FOR DETECTION OR CONTROL OF ICE OR FOR OTHER PURPOSES

Lewis L. Cunningham, Glendale, Calif., assignor to General Controls Co., Glendale, Calif., a corporation of California Application June 7, 1941, Serial No. 397,148

15 Claims. (Cl. 123—122)

This invention relates to pressure responsive apparatus and to a control system useful therewith. Although my invention is useful in other fields, it will be primarily described as applied to the detection or control of ice formation in the air induction system of an internal combustion engine on aircraft and to other uses on aircraft, since the application of the invention to other fields will be obvious therefrom.

The pressure responsive apparatus of this invention is adapted for use with a pair of conduits normally having a pressure differential therebetween, at least one of the conduits being subject to stoppage at a given position due to the formation of ice or for any other cause, and it is an important object of this invention to provide an apparatus responsive to the change in pressure differential produced by such stoppage for indicating such a stoppage or for operating control apparatus in response to such stoppage.

The deposition of ice on the parts of aircraft exposed to a moving gas stream depends not only on the temperature of the gas, but also on its humidity and the pressure changes to which it is subjected. Hence, knowledge of the temperature only of the gas stream at various positions is not necessarily indicative of the deposition of ice from the gas stream.

Most of the present ice-indicating equipment responds only to the temperature; hence the pilot is liable to bring de-icing equipment into use when it is not actually needed. For example, if the air induction system for the engine shows a low temperature, the pilot, in the interest of safety, will introduce warm air or some antifreeze liquid such as alcohol into the system even when no ice is present, with a resultant lowering of engine efficiency. On the other hand, the pilot is liable to not bring de-icing equipment into use quickly enough and find that the power of the engine is impaired by ice at a critical time.

A particular object of this invention is to provide apparatus responsive to the actual deposition of ice on a member exposed to a moving gas stream, which may be used to give a suitable indication, or to control the operation of de-icing equipment such as means for supplying heat or warm air or means for supplying an anti-freeze liquid to the gas stream.

Another object of the invention is to provide an apparatus in which the change in pressure difference produced by a gas stream between two members exposed to the gas stream upon the deposition of ice on one of the members operates ice-indicating and/or de-icing equipment.

Another object of the invention is to provide an improved diaphragm-operated pressure-responsive system.

A further object of the invention is to provide a control system with which a member to be controlled may be moved to any one of a number of predetermined positions.

Another and more specific object is to provide an apparatus automatically operable to supply heat to the air in the induction system of an internal combustion engine when ice is deposited on a member exposed to the flow of air in such an induction system. Another specific object is to provide an apparatus automatically operable to supply different amounts of heat to the air in the induction system of an internal combustion engine when ice is deposited on members located at respectively different positions in the induction system and exposed to air flow in such system.

The apparatus of this invention is particularly adapted for the detection and control of ice formation and the following description will refer primarily to the use thereof for this purpose.

Further objects and advantages of the invention will either be specifically brought out in the ensuing description or will be apparent therefrom.

My invention will be better understood from the ensuing description taken in conjunction with the accompanying drawings, in which.

Figures 1, 2, 3:
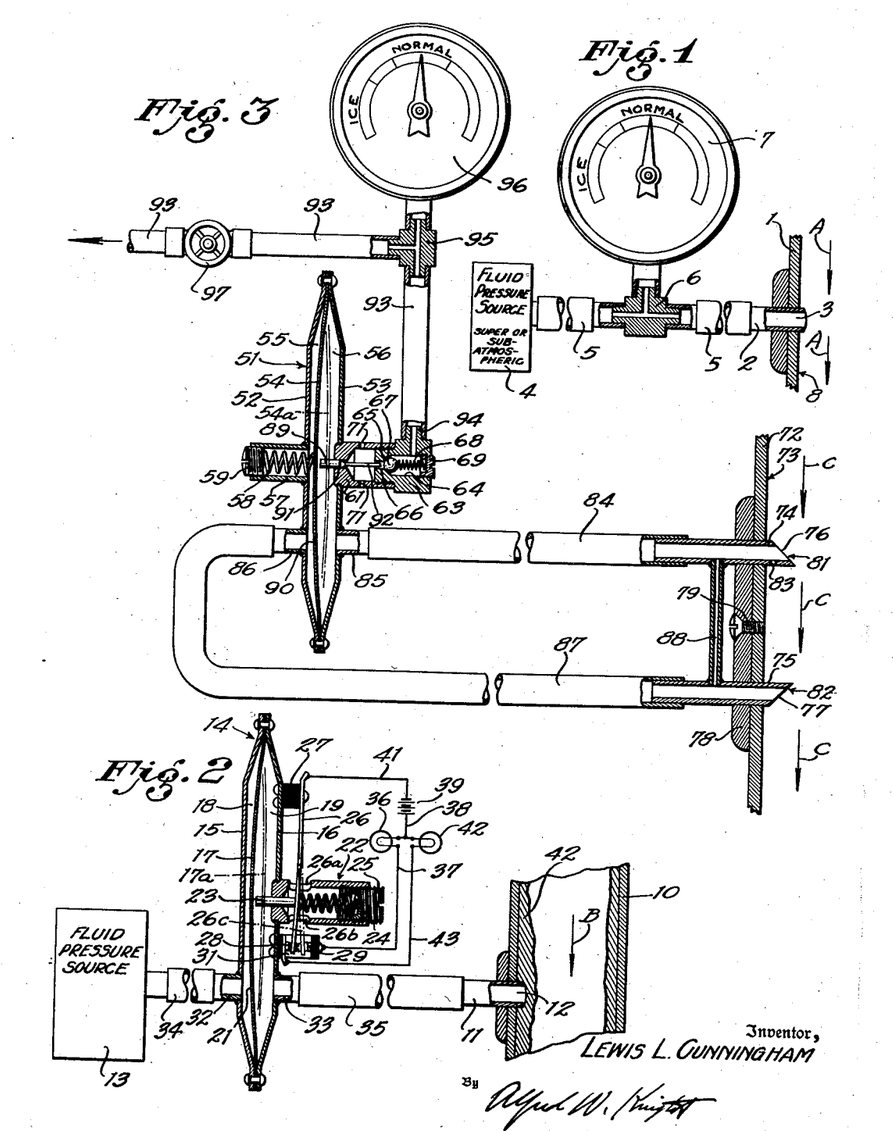
Fig. 1 is a partly diagrammatic, partly sectional, elevational view of an ice-indicating apparatus according to my invention.
Fig. 2 is a partly diagrammatic sectional elevational view of an ice-indicating apparatus of the general type shown in Fig. 1, illustrating one form of my improved pressure-responsive apparatus.
Fig. 3 is a partly sectional elevational view of another form of my ice-indicating apparatus, illustrating another form of my pressure-responsive apparatus and my preferred means for obtaining fluid pressures to operate my pressure-responsive apparatus.

Referring to Fig. 1, a member exposed to a moving gas stream is indicated at 1 and may comprise, for example, an airplane wing surface or one of the walls of a conduit such as the air induction conduit of an internal combustion engine. The path of gas flow is indicated by the arrows A. Extending through the member 1 for a short distance into the air stream is an orifice member such as a small tube 2 having an opening 3 therein which communicates through a conduit 5 with a fluid pressure system 4 comprising a supply of gas such as air under either superatmospheric or subatmospheric pressure. A suitable pressure-indicating device 7 is connected to the conduit 5 through a T 6 and is responsive to pressure change in a portion of the fluid pressure system.

The choice of pressure at which the fluid pressure source 4 operates depends upon the range of fluid pressures experienced at the wall 8 of the member 1 during normal operating conditions. For example, if the gas pressure at the wall 8, i. e., at the opening 3, is normally superatmospheric, it is preferable to use subatmospheric pressures in the system 4. The gauge 7 would then be chosen to give readings over a range of subatmospheric pressures with a maximum scale reading equal to the pressure of the source 4.

During normal operation with no ice deposited on the wall 8 of the member 1 and over the opening 3, the gauge 7 will indicate a pressure in the system intermediate the pressures of the fluid pressure source 4 and the pressure at the opening 3 due to the pressure gradient existing along the conduit 5. When ice is deposited on the wall 8 and over the opening 3 of the orifice member, the pressure in the conduit 5 forming part of the fluid pressure system will drop to that of the fluid pressure source 4 and the gauge 7 will indicate this pressure. Thus the change in pressure in a portion of the fluid pressure system indicates the deposition of ice on the member 1 over the opening 3 which communicates with the fluid pressure system. The scale of the gauge 7 may be calibrated to indicate normal and ice conditions as shown.

Referring to Fig. 2, a section of a conduit such as an air induction conduit in which the gas pressures are normally subatmospheric and never appreciably superatmospheric, is indicated at 10. The direction of gas flow is indicated by the arrow B. The term "gas" is meant to include air or mixtures of air and fuel. An orifice member, such as a small tube 11 is shown extending through the wall of the conduit 10 for a short distance and has an opening 12 communicating with the gas in the conduit. A fluid pressure source is indicated at 13 and may comprise a source of air or other gas at a substantially constant superatmospheric pressure.

A pressure-responsive device for indicating the change in pressure in the system produced by the deposition of ice over the opening 12 comprising part of the fluid pressure system, is shown at 14, and comprises a substantially air-tight casing formed from a pair of substantially circular, oppositely dished plates 15 and 16. A thin flexible diaphragm 17 of light metal or the like is secured at its circumferential portions between the plates 15 and 16 to divide the casing into two chambers indicated at 18 and 19. The diaphragm 17 is provided with a restricted opening 21 therethrough, providing restricted communication between the chambers 18 and 19 for reasons that will appear subsequently.

A tubular support member 22 is secured to the central portion of the member 16 and extends outwardly therefrom. A pin 23 is slidably mounted in the inner end of the member 22 and is adapted to contact the diaphragm 17 and move longitudinally in response to movement of the diaphragm. The pin 23 is biased toward the diaphragm by compression spring 24 mounted within the member 22 and held therein by means of a screw plug 25 threaded into the upper end of the member 22. The member 25 may be screwed in and out to change the bias on the pin 23.

The force of the spring 24 is transmitted to the pin 23 through a spring contact arm 26 which is secured at one end to an insulated block 27 which is in turn secured to the casing member 16. The arm 26 extends transversely of the support member 22 through slots 26a and 26b which allow for limited movement of the member 26 in the longitudinal direction of the member 22.

The diaphragm 17 is movable in accordance with pressure conditions existing in the chambers 18 and 19 between the full line position and a dot-dash position indicated at 17a. When the diaphragm is in its full line position the contact arm 26 makes connection with a fixed contact 28 which may be mounted on the member 16 and suitably insulated therefrom. Movement of the diaphragm 17 to its dot-dash position causes movement, through the agency of the pin 23, of the member 26 to its dot-dash position as indicated at 26c. In its dot-dash position the spring arm 26 makes connection with a fixed contact 29 which is insulated from the contact 28 and may be carried on suitable supporting structure 31 which may be mounted on the casing portion 16.

The casing portions 15 and 16 are provided respectively with connections 32 and 33 through which the pressure source 13 and the orifice member 11 may be placed in fluid communication with the chambers 18 and 19, respectively, through the agency of conduits 34 and 35, respectively.

Under normal conditions, with the opening 12 substantially unobstructed, the pressure differential in the chambers 18 and 19 will force the diaphragm into its dot-dash position indicated at 17a, closing the connection between contacts 26 and 29 and lighting a signal lamp 36 which is connected to the contact 29 through a conductor 37 and to the contact 26 through a conductor 38, a battery 39 and a conductor 41. The system is so constructed and arranged that the pressure differential between the chambers 18 and 19 will maintain the diaphragm in its dot-dash position against the pressure of the spring 24 notwithstanding the loss in pressure through the opening 21 in the diaphragm.

Upon the deposition of ice in the conduit 10 as indicated at 42, the opening 12 is closed so that there can be no further gas flow therethrough. The bias of the spring 24 on the pin 23 forces the diaphragm from its dot-dash position toward its full line position. The pressure in the chambers 18 and 19 is equalized by gas flow through the opening 21 so that the diaphragm may move from its dot-dash position to its full line position. In that position the contact 26 connects with the fixed contact 28, lighting a signal lamp 42 which is connected to the contact 28 by a conductor 43 and to the contact 26 through the conductor 38, the battery 39 and the conductor 41.

Referring to Fig. 3 a fluid pressure-responsive device somewhat comparable to that illustrated in Fig. 2 is indicated at 51, and comprises opposing casing portions 52 and 53 joined to one another at their marginal portions to form a chamber. A thin flexible diaphragm of metal or other suitable material is indicated at 54 and is secured at its marginal portions between the casing portions 52 and 53 to divide the interior of the casing into a pair of chambers 55 and 56. A tubular member 57 is shown extending outwardly from the face of the casing member 52 for retaining a compression spring 58. The outer end of the member 57 is closed by a threaded plug 59 which bears against one end of the spring 58. The other end of the spring bears against the diaphragm 54 to bias it toward its dot-dash position indicated at 54a.

A tubular supporting member 61 is shown secured to the casing portion 53 and extending outwardly therefrom. A valve member 63 is shown threadedly secured to the outer end of the member 61 and provided with longitudinally extending bore 64 terminating in a valve seat 65 at its inner end. Fluid communication between the interior of the member 61 and the valve seat is provided through a small passage 66. A ball 67 is shown in position on the seat 65 closing the passage 66 and held thereon by a compression spring 68 which is held in position in the bore 64 by a plug 69 threaded into the outer end of the bore. The passage 66 communicates with the atmosphere through one or more openings 71 provided in the member 61.

A structural member 72 such as a wing surface or an air induction conduit having a surface 73 past which the gas stream moves as indicated by the arrows C, is shown provided with a pair of orifice members 74 and 75, such as small tubes, which are positioned to be exposed to the gas stream and have openings 76 and 77 therein which are exposed to the gas flow and are spaced from one another in the direction of gas flow. The members 74 and 75 are so constructed and positioned that the movement of the gas stream produces a pressure differential between the openings 76 and 77. The tubes 74 and 75 extend through suitable openings in the member 72 and are carried by a mounting bracket 78 which is secured to the member 72 as by a screw 79.

To produce the desired pressure differential between the orifice members 74 and 75, the ends of these members are so constructed or positioned as to face different directions in the gas stream. For example, the end of the member 74, indicated at 81, faces upstream, while the end of the member 75, indicated at 82, faces downstream. In order to prevent the accumulation of liquids in the system, as from moisture condensation, the downstream side of the member 74 is preferably provided with a small opening 83 adjacent the wall 73 in order that liquids may drain from the tube 74.

The member 74 is in fluid communication with the chamber 56 through a conduit 84 which is attached to a connection 85 carried by the casing member 53 and communicating with the chamber 56. A connection 86 is carried by the casing portion 52 and communicates with the chamber 55. Fluid communication between the connection 86 and the member 75 is provided by a conduit 87. A pressure equalizing passage which also acts as a liquid drain is shown at 88 extending between the members 74 and 75.

The pressure differential between the openings 76 and 77 produced by the gas stream is normally sufficient to create an excess pressure in the chamber 56 forcing the diaphragm 54 to its full line position, against the action of the spring 58. The deposition of ice over either one of the openings 76 or 77 will lower the fluid pressure in the fluid pressure system communicating with the openings 76 and 77, to a value at which the action of the spring 58 will move the diaphragm to its dot-dash position. During movement the pressure in the chambers 55 and 56 is equalized by the flow of fluid through the equalizing passage 88. If desired an opening 90 may be provided in the diaphragm 54 for the same purpose. If such is the case the passage 88 may be omitted, although both the passage 88 and opening 90 may be employed. When only the opening 90 is used the operation thereof is the same as the opening 21 of Fig. 2.

Movement of the diaphragm toward its dot-dash position will cause the diaphragm to engage a pin 89 which makes a close sliding fit with a passage 91 in the inner end of the member 61, and move the pin so that the outer end thereof, of reduced diameter, as indicated at 92, engages the ball 67 and moves it from its seat 65. This opens the valve 63 and provides fluid communication between the bore 64 and the atmosphere through the openings 71 and the space in the passage 66 around the outer end 92 of the pin 89.

The opening of the valve 63 may be used to operate apparatus for the indication of the presence of ice and/or for the removal of ice. For example, a conduit 93 leading to a pressure source such as a vacuum line, may be connected to outlet connection 94 of valve 63 and provided with a T 95 by means of which a connection is made to a pressure gauge 96 responsive to fluid pressures in the conduit 93. When the valve 63 is closed, the gauge gives a reading substantially equal to the pressure of the vacuum line. When the valve 63 is open, air is admitted to the conduit 93 through the opening 71 and the pressure in the conduit is changed, raised in this case, and the changed pressure is indicated by the gauge 96. In order to provide the largest possible pressure change in the conduit 93 at the position of the T 95, a valve may be provided at 97 to restrict the passage of air through the valve to the vacuum line, so that air can enter the system through the valve 63 faster than it can be withdrawn through the valve 97.

It should be obvious that the pressure-responsive device of Fig. 2 which is operable to make and break electrical contacts, may be substituted for the pressure-responsive device of Fig. 3 which operates to open or close a valve. Such substitution may be made by connecting the outlet members 32 and 33 of Fig. 2 to the conduits 84 and 87 respectively of Fig. 3. Alternatively, the pressure-responsive device of Fig. 3 may be substituted for the device in Fig. 2 by attaching the connections 85 and 86 to the conduits 34 and 35 respectively.

It will be noted that each of the ice-responsive apparatus comprises a fluid pressure system through which there is fluid flow at all times when the opening in the associated orifice member is open, the orifice itself permitting flow in the system. Stoppage of the orifice in an associated orifice member by the depositing of ice thereover, prevents further flow through the fluid pressure system. In each example different pressure conditions exist in a portion of the fluid pressure system of which an orifice member forms a part, when the orifice member is open and when it is closed.

In Fig. 1, one fluid pressure obtains at the T 6 when there is flow through the conduit 5 and orifice 3, and another pressure obtains when the orifice is closed, since there is no longer a pressure gradient along the conduit resulting from fluid flow. In Fig. 2, fluid flows through the fluid pressure system between the pressure source 13 and the orifice 12 when the orifice is open, since fluid communication therebetween is provided by the relatively small opening 21 in the diaphragm 17.

This opening is sufficiently small so that the pressure drop therethrough is sufficient for the fluid pressure in the chamber to move the diaphragm against the action of the biasing spring, and is greater than the pressure drop in the remaining part of the fluid pressure system between the other side of the diaphragm and the orifice 12. Upon closing of the orifice member 12, fluid flow therethrough is stopped. However, flow through the opening 21 continues and the pressure drop through the opening begins to decrease. As the space in the fluid pressure system between the orifice and the diaphragm begins to approach the fluid pressure in the space on the other side of the diaphragm, the bias on the diaphragm causes movement thereof to its full line position. During such movement flow through the opening 21 continues although there is no flow through the orifice 12. When the diaphragm finally comes to rest at its full line position, flow through the opening 21 has ceased and a static condition is reached in which the pressures throughout the system are substantially equal.

In general the same conditions exist during operation of the form of the invention shown in Fig. 3. In that form of my invention fluid flow between the orifices 76 and 77 is provided through the opening 90 and/or the small tube 88. In this form of my invention the required operating pressure is supplied by the action of the gas stream on the orifice members. The pressure drop across the opening 90 and/or the tube 88 is greater than the pressure drop in the system on the other side of the opening 90 and/or the tube 88, whereby the diaphragm 54 is held against its bias when the orifices are open. Upon closing of either of the orifices 76 or 77, these dynamic pressure conditions no longer obtain and pressure equalization on opposite sides of the diaphragm, diaphragm movement, and the attendant equalizing flow through the opening 90 and/or tube 88 takes place.

It is to be understood that the orifice members described herein are to be taken as illustrative rather than limitative. For example, they need not extend into the gas stream when the velocity head imparted by the gas stream is not required for operation. As another example, an orifice member may comprise a plurality of relatively small orifices, such as may be produced by placing a fine mesh screen over the orifice of any of the orifice members described herein.

In Figs. 4 to 8 I have illustrated a system for supplying heat to the air induction system of an internal combustion engine such as an airplane engine upon the deposition of ice at any one of a number of positions within the air induction system. The air induction conduit is indicated at 101 and is provided with an air scoop 102 at its inlet end and discharges at its outlet end into a supercharger casing indicated diagrammatically at 103. Although my system is generally applicable to any type of air induction conduit it will be described as used in connection with an injection carburetor, in which case the conduit will be provided with Venturi throats 104 and 105 and with a spray nozzle 106 for the injection of fuel. The function of the venturis 104 and 105 is to control the amount of fuel discharged from the nozzle 106 and need not be described herein. The conduit 101 is further provided with a movable throttle valve such as a butterfly valve 107 located between the venturis and the spray nozzle. A plurality of pairs of orifice members indicated at 108 and 109, 110 and 111, and 112 and 113, are shown extending within the conduit 101. The orifice members of each pair may be constructed in substantially the same manner as the orifice members 74 and 75 shown in Fig. 3. Each orifice member has an opening therein exposed to the air stream in the conduit and is so shaped and so positioned with respect to the other orifice member of its pair as to form a fluid pressure system which maintains a pressure differential between the openings as long as both openings are substantially unobstructed.

Figures 3, 4, 5, 6, 7, 8:
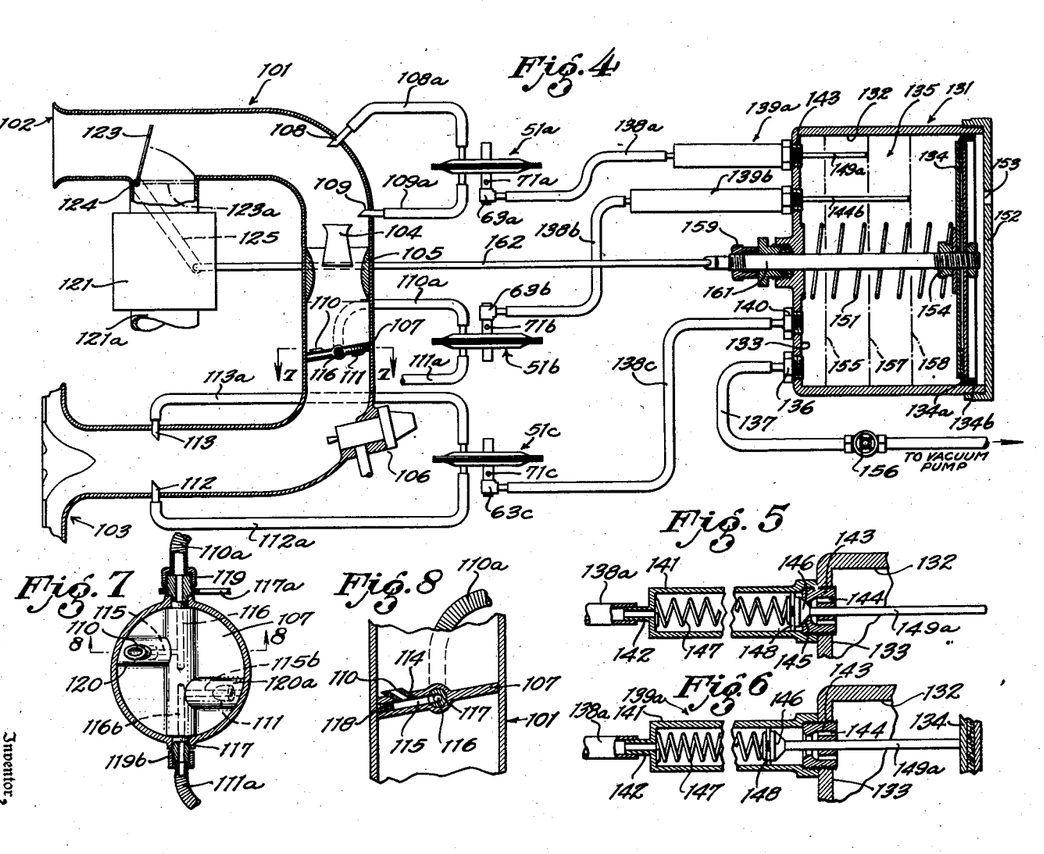
Fig. 4 is a partly diagrammatic, partly sectional, elevational view of a complete system for applying heat in regulated quantities to the air induction system of an internal combustion system and illustrating a control apparatus according to my invention.
Fig. 5 is a longitudinal sectional view of one of the valves of Fig. 4, the valve being shown in closed position.
Fig. 6 is another view of the valve in Fig. 5 showing it in open position.
Fig. 7 is a partly sectional plan detail taken along line 7—7 in Fig. 4.
Fig. 8 is a transverse sectional view taken along line 8—8 in Fig. 7.

The apparatus further comprises a plurality of fluid pressure-responsive devices 51a and 51b and 51c, each of which may be the same as the one indicated at 51 in Fig. 3. The pressure-responsive devices are each provided with a control valve indicated at 63a, 63b and 63c, respectively, which are adapted to remain closed as long as the pressure differential is maintained between the orifice members of each pair and which is adapted to open when at least one orifice member of its associated pair is closed by a deposit of ice. The respective pair of orifice members 108 and 109, 110 and 111, and 112 and 113 are connected to the respective pressure-responsive devices 51a, 51b and 51c by three pairs of conduits 108a and 109a, 110a and 111a, and 112a and 113a, respectively.

It will be noted that the orifice members 110 and 111 are located in the air induction conduit on the butterfly valve 107 since ice often occurs at this position due to the rapid pressure changes that occur there. The member 110 is shown mounted on the upstream face of the butterfly valve 107 within a bore 114 extending part way through the butterfly valve from the face thereof. The butterfly is further provided with another bore 115 parallel to the face thereof and intersecting with the bore 114. The assembly is also provided with a bore 116 intersecting with the bore 115 and passing through a shaft 117 upon which the butterfly is moved for throttle adjustment. The outer end of the bore 115 is closed by a screw plug 118 to prevent pressure loss in the system. The conduit 110a is attached to the shaft 117 by a suitable connection indicated at 119.

The orifice member 111 is mounted on the low pressure side of the valve 107 in substantially the same manner as the orifice member 110 and is connected to the conduit 111a through connecting bores 115b and 116b extending parallel to the face of the valve and through the shaft 117 respectively. Suitable means is provided at 119b for connecting the conduit 111a to the shaft 117 in communication with the bore 116b. The conduits 110a and 111a are sufficiently flexible so that the valve may be rotated to different positions by the shaft 117. An operating arm for the throttle valve shaft is indicated at 117a. The butterfly valve 107 is shown thickened at 120 and 120a in order to provide space for the bores 115 and 115b respectively.

The apparatus is further provided with means operable to introduce heat into the air induction conduit, such means being indicated diagrammatically at 121. As one example, such heating means may comprise means for passing air in heat interchanging relation with the heated surfaces of the engine as through the cowling around the outside of the cylinders or around members carrying exhaust gases, and is provided with an air inlet conduit 121a connected to a source of air and with a hot air outlet conduit 122 communicating with the main air induction conduit 101 at a position upstream from the positions of the orifice members 108 and 109. The hot air outlet conduit 122 is provided with a damper 123 which is mounted for pivotal movement about a shaft 124 between a position in which the conduit 122 is substantially unobstructed as indicated in full lines and a position substantially completely closing the conduit 122 as indicated at dot-dash lines at 123a. In this particular form of my invention the damper 123 also increasingly restricts the flow of air through the main induction conduit from positions upstream from the damper as the damper is moved from its dot-dash position to its full line position. An operating arm 125 secured to the damper shaft 124 is provided for moving the damper to its different positions.

A control apparatus according to my invention, comprising fluid pressure motor means, is indicated generally at 131 and is shown as comprising a pair of wall means relatively movable with respect to one another and cooperating with one another to form an operating space. As one example, the apparatus is shown as comprising a cylinder 132 having a head 133 and provided with a piston 134 movable toward and away from the head and defining an operating space 135 of a size which may be varied by relative movement of the piston and head. The piston is provided with a suitable packing cup 134a held resiliently against the cylinder walls by means of a spring expander ring 134b suitably retained on the piston.

The cylinder head 133 is provided with a fitting 136 to which is connected a conduit 137 leading to a suitable low pressure source such as a vacuum pump or vacuum line normally present on the airplane. During operation the conduit 137 continuously operates to remove air from the space 135 to move the piston 134 toward the head 133. A plurality of vent passages 138a, 138b, and 138c provide communication between the space 135 and the atmosphere. The passages 138a, 138b, and 138c are respectively connected to the control valves 63a, 63b, and 63c and communication to the atmosphere is provided through the openings 71a, 71b, and 71c when the respective control valves are open. The vent passages 138a and 138b are connected to the operating space 135 through valves 139a and 139b which may be called positioning valves and which are carried on the cylinder head 133. The passage 138c is connected directly to the cylinder head through a fitting 140 since no positioning valve is required in this passage as will be apparent subsequently.

The construction of the positioning valves 139a and 139b may be generally the same, the valve 139a being illustrated in detail in Figs. 5 and 6. The valve 139a is shown as comprising a generally cylindrical body 141 provided at its outer end with means for connecting it to the passage 138a such as reduced tubular portion 142 and at the other end with a head member 143 adapted to threadedly engage the cylinder head 133. The head member 143 is provided with a plurality of longitudinally extending passages 144 for providing communication between the operating space 135 and a valve seat 145 located on the interior of the body 141. A poppet valve 146 is shown within the cylinder 141 and is adapted to sealingly engage the seat 145 to shut off communication between the operating space and the vent passage 138a. The valve 146 is biased toward its closed position by a compression spring 147 which is guided in the body member 141 by a spider 148 positioned between one end of the spring and the valve 146. The valve 146 is carried on a valve stem 149a which extends through the member 143 into the operating space 135 and is guided for axial movement by the member 143. The valve 139b is also provided with a valve stem indicated at 149b which is longer than the valve stem 149a and extends further into the operating space from the cylinder head 133 when both valves are closed as shown in Fig. 4.

The cylinder 132 is provided with suitable means such as a compression spring 151, for biasing the piston 134 away from the head 133 of the cylinder 132. When all of the passages 138a, 138b, and 138c are closed, the bias provided by the spring 151 is insufficient to prevent movement of the piston 134 toward the head 133 as air is exhausted from the operating space through the conduit 137. The cylinder 132 is provided with a suitable cover 152 at its open end to protect the piston and this cover is provided with a vent 153 through which air may flow as the piston 134 is moved to different positions.

With the control valves 63a, 63b, and 63c all closed, the piston 134 will move toward the head end of the cylinder until its movement is arrested by a stop member 154 engaging the head of the cylinder, the position of the inner face of the piston for such a condition being indicated by the dot-dash line 155. When the piston is in the position indicated by the dot-dash line 155, positioning valves 139a and 139b are opened, since the piston 134 engages the valve stems 149a and 149b on its inward movement and moves the stems longitudinally to move and hold their associated valves off of their respective seats. This action is illustrated in Fig. 4. In this connection it will be noted that the body members 139a and 139b are sufficiently long to accommodate for the movement of the valve stems therein.

With the piston at the position of the dot-dash line 155 opening of either of the valves 63a or 63b will cause movement of the piston outwardly from the cylinder head 133 to a position closing either the valve 139a or the valve 139b. To insure this movement the conduit 137 is provided with an adjustable valve 156 to regulate the amount of air pumped from the space 135 so that this is always less than can be introduced to the space through any of the passages 138a, 138b, or 138c when any of these passages are opened.

For example, if the valve 63a opens, air flows through the passage 138a from the opening 71a to the operating space 135. Since air is supplied to the space 135 at a higher rate than it can be withdrawn through the conduit 137, the spring 151 operates to move the piston 134 away from the cylinder head 133. This movement continues until the inner face of the piston reaches a position indicated by the dot-dash line 157 at which position the piston no longer engages the valve stem 149a and the valve 146 rests on its seat 145 closing the passage 138a. The piston 134 then oscillates back and forth across the line 157 between positions a short distance from each side of the line 157. Each time the piston moves to the right of the line 157 the passage 138a closes and air is withdrawn through the conduit 137 at a high enough rate to move the piston to the left toward the line 157. As the piston moves to the left past the line 157 it engages the valve stem 149a and opens the valve 139a opening the passage 138a and allowing air to enter the operating space at a higher rate than it can be withdrawn through the conduit 137. At this time the piston movement is reversed through the action of the spring 151 and it is moved to the right toward the line 157. This action is continued as long as only the control valve 63a is open.

If control valve 63b is open or both control valves 63a and 63b are open, the piston will take a position as indicated by the dot-dash line 158. The valve 139a is open as long as the piston is between the positions indicated at 155 and 157. However, at all positions of the piston removed from the position indicated at 157 in the direction from the position 157 toward the position 158, the valve 139a is closed and has no control over the positioning of the piston as long as either of the passages 138b or 138c is open.

When only the valve 63c is opened or when it is opened at the same time as any or all of the other valves are opened, the piston assumes the position shown in full lines in Fig. 4. This position is determined by a stop member 159 carried on a piston rod 161 which is secured to the piston and extends through the head 133 of the cylinder.

It should be obvious that the motor means 131 may be used to operate any desired means for supplying heat or to operate any other desired form of de-icing or anti-icing means. As one example, the piston rod 161 of the motor means is suitably connected to the operating arm 125 of the damper 123 through an operating link 162. In its full line position the piston 134 operates to hold the damper 123 in its full open position as indicated in full lines. In the position indicated by the dot-dash line at 155, the piston 134 operates to hold the damper 123 in its fully closed position as indicated by dot-dash lines at 123a. At the positions indicated by the dot-dash lines 157 and 158 the piston 134 moves the damper 123 to progressively open the warm air conduit 122 to introduce progressively greater amounts of heat to the main induction conduit 101.

When the system is in operation and no ice is deposited on the orifice members in the air induction conduit, the piston 134 assumes the position indicated by the dot-dash line 155 and operates to close the warm air conduit 122 so that no heated air is introduced into the conduit 101. If ice is deposited over either one of the orifice members 108 or 109, valve 63a is opened and the piston 134 moves to the position indicated by the dot-dash lines 157 to partially open the conduit 122 and introduce a small quantity of heated air into the induction conduit 101. If ice forms over either one of the orifice members 110 or 111 the piston 134 moves to the position of the dot-dash line 158 to move the damper 123 to a position introducing a larger quantity of heated air into the conduit 101. The formation of ice over either one of the orifice members 112 or 113 causes movement of the piston 134 to its full line position to move the damper 123 to its full open position as indicated in full lines.

It has been assumed that suitable means has been provided for equalizing the pressure on the opposite sides of the diaphragms in the fluid pressure-responsive devices 51a, 51b and 51c. For example, the diaphragms may be provided with a small opening therethrough such as the opening 90 in Fig. 3. If desired the orifice members in the respective pairs may be connected by small bypass tubes such as indicated at 88 in Fig. 3 for preventing the entrapment of liquid in the system. As pointed out previously such bypass passages also function in the same manner as the small opening provided in each diaphragm.

It will be noted that if ice forms over a plurality of orifice members at the same time, the piston will move to a position to supply heat in accordance with the orifice member controlling the largest amount of heat. It has been assumed that the amount of heat required to combat icing will increase progressively with the deposition of ice at positions spaced from one another in the direction of gas flow through the conduit 101. That is, less heat will be required to remove ice at the positions of the orifice members 108 and 109 than at the position of the orifice members 112 and 113. This is not necessarily true in all installations and it is to be understood that the positioning of the orifice members illustrated in Fig. 4 is to be taken as illustrative rather than limitative.

As pointed out previously, the choice of pressure of the fluid pressure sources 4 and 13 of Figs. 1 and 2 depends upon the range of pressures experienced at the orifices 3 and 12 respectively. However, it is generally preferable to choose a pressure for the pressure sources which is lower than that experienced at the orifices whereby the flow through the orifices is inward and there is less tendency to break down any deposit of ice formed over the orifices.

It should now be apparent that any stoppage occurring in the conduit 5 between the T 6 and the orifice 3 in Fig. 1 will be indicated whether or not it results from ice. Any stoppage occurring in the conduits 34, 35 (Fig. 2) or 84 and 87 (Fig. 3) will also be indicated since it will result in movement of the members 17 and 55 respectively of Figs. 2 and 3. The fluid bypass passages provided by the openings 21 and 90 establish communication between the associated conduits at position between the position of the stoppage and the movable members or diaphragms 17 and 55, and thus cause the pressure in the conduits to become equalized in the event of such stoppage. In cases where no opening is provided in the movable member or diaphragm, as by the omission of the opening 90 in Fig. 3, the system is responsive to stoppages occurring between the bypass tube 88 and the orifices 76 and 77. Obviously, the bypass tube 88 may be located nearer the pressure responsive element 55 and farther from the orifices, whereby the system is responsive to stoppage at a greater number of positions along the conduits connecting the orifices with the pressure responsive element.

Consequently, although I have described the invention as applied particularly for the detection or control of ice formation, it will be apparent that it is not limited to this particular use, but may be used for other purposes in which it is desired to provide a member to be used for the purpose of indication or control and which is movable in response to a change in the pressure differential between two conduits, at least one of which is subject to stoppage at a given position.

Although I have shown only a flat diaphragm as a movable pressure responsive member, it should be obvious that any equivalent pressure-responsive means may be employed. For example, a corrugated diaphragm or bellows or a movable piston may be employed. It should also be apparent that the casing enclosing the movable member need not be substantially rigid as shown, but may be relatively flexible. For example, the casing may be formed as a pair of bellows separated by a central wall comprising the movable member.

My invention is obviously subject to considerable modification and hence I do not choose to be limited to the examples described and illustrated herein but rather to the scope of the appended claims.

I claim:

1. In an apparatus responsive to the deposition of ice on a member exposed to a moving gas stream, the combination which comprises: a casing; a diaphragm dividing the casing into two chambers and movable between a first position and a second position; means connected to said chambers, including a member having an opening extending into the gas stream and communicating with one of said chambers, for maintaining a pressure difference between said chambers to hold said diaphragm in its first position; means biasing said diaphragm toward its second position and operable to move said diaphragm to its second position upon the reduction of said pressure difference by the deposition of ice over said opening; and means defining a fluid bypass passage between said chambers for equalizing the pressure in said chambers when said opening is closed.

2. In an apparatus responsive to the deposition of ice on a member exposed to a moving gas stream, the combination which comprises: a casing; a diaphragm dividing the casing into two chambers and movable between a first position and a second position; means connected to said chambers, including a member having an opening extending into the gas stream and communicating with one of said chambers, for maintaining a pressure difference between said chambers to hold said diaphragm in its first position; and means biasing said diaphragm toward its second position and operable to move said diaphragm to its second position upon the reduction of said pressure difference by the deposition of ice over said opening, said diaphragm having an opening therethrough for equalizing the pressure in said chambers when the opening in said member is closed.

3. In an apparatus responsive to the deposition of ice on a member exposed to a moving gas stream, the combination which comprises: a pair of members extending into the gas stream, each having an opening therein communicating with the gas stream, said members being so constructed and positioned that the movement of the gas stream produces a pressure differential between said openings; a diaphragm movable between first and second positions; conduit means connecting said openings to respectively opposite sides of said diaphragm whereby said diaphragm is held in said first position by the pressure differential between said openings; means biasing said diaphragm toward said second position and operable to move said diaphragm to said second position upon the reduction of said pressure differential by the deposition of ice over one of said openings; and means defining a fluid bypass passage providing communication between opposite sides of said diaphragm, whereby fluid pressures upon opposite sides of the diaphragm may equalize upon closing of one of said openings.

4. In an apparatus responsive to the deposition of ice on a member exposed to a moving gas stream, the combination which comprises: a pair of members extending into the gas stream, each having an opening therein communicating with the gas stream, said members being so constructed and positioned that the movement of the gas stream produces a pressure differential between said openings; a diaphragm movable between first and second positions; conduit means connecting said openings to respectively opposite sides of said diaphragm whereby said diaphragm is held in said first position by the pressure differential between said openings; and means biasing said diaphragm toward said second position and operable to move said diaphragm to said second position upon the reduction of said pressure differential by the deposition of ice over one of said openings, said diaphragm having an opening therethrough whereby fluid pressures upon opposite sides of the diaphragm may equalize upon closing of one of said first-mentioned openings.

5. For use with an internal combustion engine having an air induction conduit provided with a movable throttle valve, an apparatus responsive to the deposition of ice in the conduit, comprising: a pair of orifice members mounted on the valve and movable therewith, said orifice members each having an opening therein exposed to the gas stream in the conduit and the respective openings being located at opposite sides of the valve, said members being so constructed and positioned that the movement of the gas stream produces a pressure differential between said openings; and means associated with said members and responsive to the change in pressure differential resulting from deposition of ice over one of said openings.

6. In a system wherein a gas pressure differential is normally maintained in a pair of conduits at least one of which is subject to stoppage at a given position, the combination comprising: a casing, a diaphragm dividing the casing into two chambers and movable between a first position and a second position, said conduits being connected to the chambers to maintain said diaphragm in its first position in response to the pressure differential between said conduits; means biasing said diaphragm toward its second position; and means defining a fluid bypass passage establishing communication between the conduits at a position between said given position and said chambers, said passage equalizing the pressure in said chambers when a stoppage occurs.

7. In a system wherein a gas pressure differential is normally maintained in a pair of conduits at least one of which is subject to stoppage at a given position, the combination comprising: a casing; a diaphragm dividing the casing into two chambers and movable between a first position and a second position, said conduits being connected to the chambers to maintain said diaphragm in its first position in response to the pressure differential between said conduits; and means biasing said diaphragm toward its second position, said diaphragm having an opening therethrough for equalizing the pressure in said chambers when a stoppage occurs.

8. For use with an internal combustion engine having an air induction conduit and having heating means operable to introduce heat into said conduit, the combination which comprises: a plurality of members each having an opening therein exposed to the flow of air through the induction conduit, said members being located at different positions in the conduit; a separate fluid pressure system in fluid communication with each of said openings; a movable member in each of said fluid pressure systems and each responsive to the pressure condition in a portion of its associated fluid pressure system and each operable to one position in response to the pressure condition at said portion of its associated pressure system when its associated opening is open and each operable to a second position in response to a change in the pressure condition at said portion of its associated pressure system when ice is deposited over its associated opening; and means associated with said movable members and controlling the heating means and operable to introduce a different amount of heat into the conduit upon the movement of respectively different ones of said movable members to their second positions, and also operable, when a plurality of said movable members are moved to their second positions, to introduce an amount of heat corresponding to that introduced by that one of the members so moved which is operable to introduce the larger amount of heat.

9. For use with an internal combustion engine having an air induction conduit and having heating means operable to introduce heat into said conduit, the combination which comprises: a plurality of members each having an opening therein exposed to the flow of air through the induction conduit, said members being located at different positions in the conduit; a separate fluid pressure system in fluid communication with each of said openings; a movable member in each of said fluid pressure systems and each responsive to the pressure condition in a portion of its associated fluid pressure system and each operable to one position in response to the pressure condition at said portion of its associated pressure system when its associated opening is open and each operable to a second position in response to a change in the pressure condition at said portion of its associated pressure system when ice is deposited over its associated opening; and means associated with said movable members and controlling the heating means and operable to introduce heat into said conduit upon the movement of any one of said movable members to its second position.

10. For use with an internal combustion engine having an air induction conduit and heating means operable to raise the temperature of the air in said conduit, the combination which comprises: a plurality of fluid pressure responsive devices, each comprising a casing, a diaphragm dividing the casing into two chambers and movable between a first position and a second position, and means biasing the diaphragm toward its second position; a plurality of separate fluid pressure systems each associated with one of said fluid pressure responsive devices; a plurality of orifice members each located at a different position in the conduit and each having an opening exposed to the gas stream in the conduit and in fluid communication with a different one of said fluid pressure systems, each of said fluid pressure systems being connected to the chambers of its associated fluid pressure device and being operable to maintain a pressure difference between said chambers to hold the associated diaphragm in its first position when the associated opening is open, said biasing means being operable to move said diaphragm to its second position upon the reduction of said pressure difference by the deposition of ice over the associated opening; and means associated with said diaphragms and controlling the heating means and operable to introduce heat into the conduit upon the movement of any one of said diaphragms to its second position.

11. In an apparatus responsive to the deposition of ice on a member exposed to a moving gas stream, the combination which comprises: a member having an opening therein communicating with the gas stream; a fluid pressure system in fluid communication with said opening; a pressure responsive diaphragm in said fluid pressure system and movable to a first position in response to pressure conditions obtained in said system when said opening is open and movable to a second position in response to pressure conditions obtained in said system when ice is deposited over said opening; a valve controlled by said diaphragm and operable between open and closed positions upon movement of said diaphragm between its positions; and fluid pressure motor means controlled by said valve.

12. In an apparatus responsive to the deposition of ice on a member exposed to a moving gas stream, the combination which comprises: a member having an opening therein exposed to the gas stream; a fluid pressure system in fluid communication with said opening; movable means responsive to the pressure in a portion of said system and operable to one position in response to the pressure condition created at said portion of the system when said opening is open and to another position in response to a change in the pressure condition at said portion of the system produced by the deposition of ice over said opening; means defining an operating space including opposing wall means relatively movable in response to air pressure change in the space; means continuously operable to remove air from the space and normally operable to move one of the wall means in one direction from one position; means defining a vent passage leading from the space and communicating with the atmosphere; means biasing said one wall means for movement in the opposite direction and operable when said vent passage is open to move said one wall means in said opposite direction to and through said one position from a position removed in said one direction from said one position; a control valve for opening and closing said passage upon movement of said movable means between its one position and its other position respectively; a positioning valve located in said passage between said control valve and said space and also operable to open and close said passage and biased toward closed position; and means associated with the positioning valve and controlled by the movement of said one wall means and operable to maintain the positioning valve open only when said one wall means is spaced in said one direction from said one position.

13. In a control system, the combination which comprises: means defining an operating space including opposing wall means relatively movable in response to air pressure change in the space; means continuously operable to remove air from the space and normally operable to move one of the wall means in one direction from one position; means defining a vent passage leading from the space and communicating with the atmosphere; means biasing said one wall means for movement in the opposite direction and operable when said vent passage is open to move said one wall means in said opposite direction to and through said one position from a position removed in said one direction from said one position; a control valve for opening and closing said passage; a positioning valve located in said passage between said control valve and said space and also operable to open and close said passage and biased toward closed position; and means associated with the positioning valve and controlled by the movement of said one wall means and operable to maintain the positioning valve open only when said one wall means is spaced in said one direction from said one position.

14. In a system wherein a fluid pressure differential is normally maintained in a pair of conduits at least one of which is subject to obstruction: means defining a pair of chambers connected respectively to said conduits, a member disposed between said chambers and movable in one direction in response to the pressure differential in the chambers due to that normally existing in said conduits, means biasing said member in an opposite direction, and means defining a restricted passage bypassing said chambers and tending constantly to equalize the fluid pressure therebetween so that when said one or both of the conduits is obstructed the member is moved by said bias in said opposite direction.

15. A system as defined in claim 14, wherein the end of said one of said conduits away from said chamber communicates with a moving gas stream.

LEWIS L. CUNNINGHAM.